Patented Dec. 30, 1941

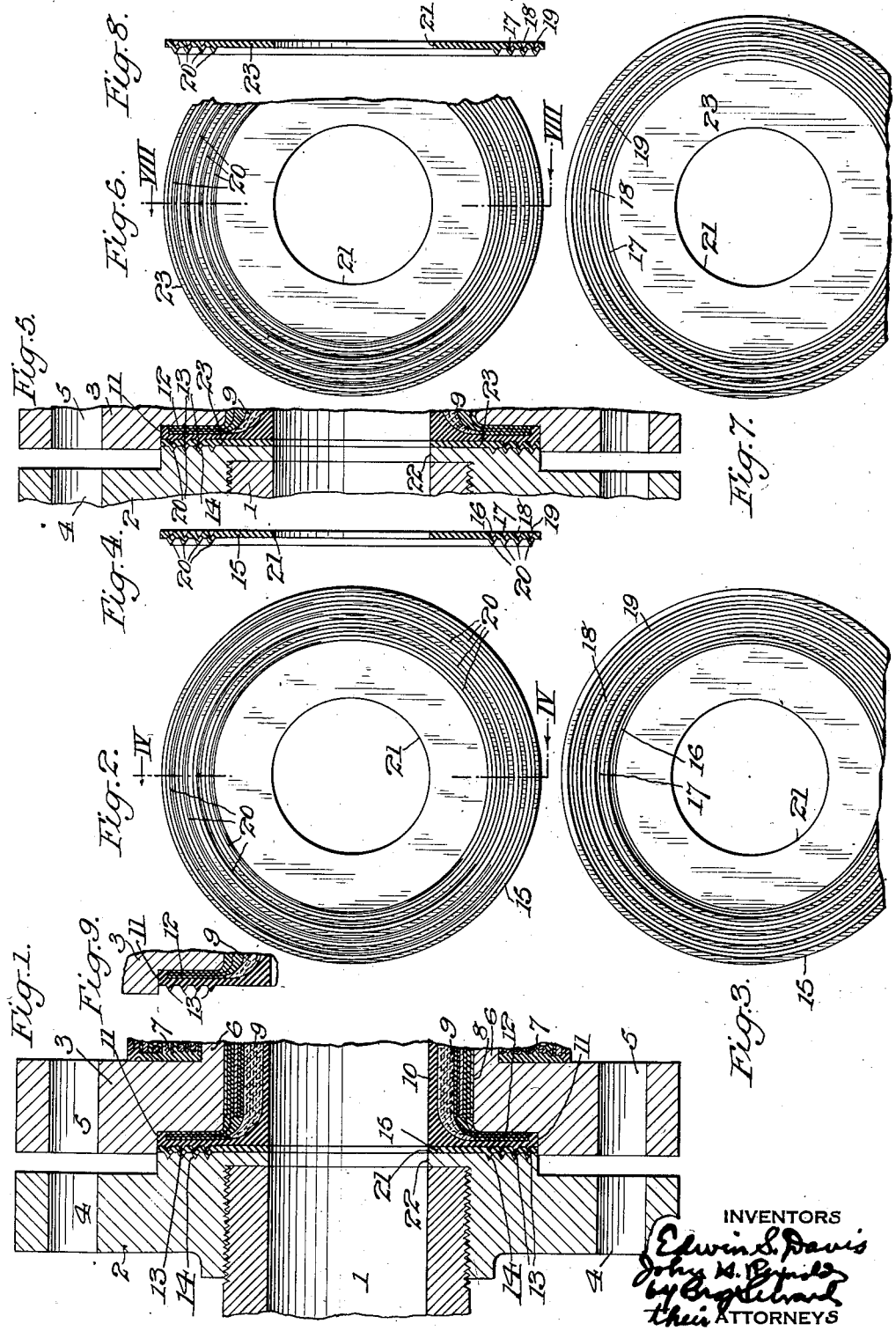

2,268,385

UNITED STATES PATENT OFFICE 2,268,385

HOSE COUPLING

Edwin S. Davis, Newton, Conn., and John H. Reynolds, Poughkeepsie, N. Y., assignors to New York Rubber Corporation, New York, N. Y., a corporation of New York Application December 20, 1939, Serial No. 310,102

3 Claims. (Cl. 285—78)

This invention relates to couplings for hose and, more particularly, to couplings for high pressure hose such, for instance, as the type that is used in connection with the drilling of oil wells.

An object of the invention is to provide such a structure that includes improved means for preventing leakage, particularly due to wear, between the coupling members.

Another object is to provide a sealing element for such a structure that is adapted to be associated with a worn or deformed coupling element so as to eliminate any defective operation due to such wear or deformation and to reestablish full, and even increased, efficiency of the parts.

Another object is to provide such a sealing element that may be put in use without changing the form, cooperative relationship, or fastening means of the coupling members.

Another object is to provide such a sealing element which may be produced at low cost and be marketed as a supply with hose and coupling members so as to be immediately available to the consumer in case of need.

Another object is to provide such a sealing element that may be manufactured in different forms so as to serve its purpose whether the conditions of wear or deformation have been such as merely to injure or substantially to destroy a part or portion of the coupling assembly.

A further object is to provide certain improvements in the form, construction, arrangement and material whereby the above named and other objects may effectively be attained.

Practical embodiments of the invention are represented in the accompanying drawing, in which Fig. 1 represents a detail vertical section through coupling members and associated parts of hose and drilling apparatus pipe, with our sealing element in position therein;

Fig. 2 represents a front view of the sealing element;

Fig. 3 represents a rear view thereof, partly broken away;

Fig 4 represents a section taken in the plane of the line IV—IV of Fig. 2, looking in the direction of the arrows;

Fig. 5 represents a detail view, similar to Fig. 1, but showing a modified form of the sealing element;

Fig. 6 represents a front view of the modified form of sealing element, partly broken away;

Fig. 7 represents a rear view of the modified form of sealing element, partly broken away;

Fig. 8 represents a section taken in the plane of the line VIII—VIII of Fig. 6, looking in the direction of the arrows; and Fig. 9 represents a fragmentary view to more clearly illustrate certain parts shown in Fig. 1.

The coupling embodying the subject matter of this invention is primarily of the kind intended to be used with hose of the class described in the co-pending application of James V. Ryan and Edwin S. Davis, Serial No. 239,766, filed November 10, 1938, Patent No. 2,241,926 dated May 13, 1941; which hose is commonly used in connection with the drilling of oil wells of very great depth, e. g. several thousand feet, the drilling operation being accomplished by rotation of a drill. The high pressure hose is, in such use, connected to the apparatus and calculated to supply a suitable fluid frequently containing abrasive materials, down through a pipe to the point or bit of the drill. The hose is generally coupled near the upper end of the drill to a swivel joint which allows for rotation of the drill, and the hose is progressively flexed at points along its length and particularly near said coupling joint as the drill advances downwardly and as the apparatus to which the hose is coupled is raised from time to time for the addition of sections to the well pipe.

Owing to the great depth to which the wells are driven, the hose is necessarily subjected to very heavy internal pressure which frequently rises to an order of, say, thirty-five hundred pounds per square inch; and it will thus be evident that there is a great tendency to leakage and failure through wear, deformation, or partial destruction of the contacting coupling elements, which tendency our invention is calculated to overcome without requiring any change in construction of the hose or main coupling elements or the manner in which the parts are assembled and used With reference to the form of our invention illustrated in Figs. 1 to 4 inclusive, the reference numeral I denotes a pipe that protrudes from a swivel joint or other suitable connection of the drilling apparatus and is threaded into a coupling member 2 which is intended for mating engagement with another coupling member 3. The said coupling members are preferably provided with an annular series of holes, two of which are shown in each coupling member and marked 4, 4 and 5, 5, for the reception of bolts or the like to rigidly fasten the members to each other.

The coupling member 3 is shouldered, as indicated at 6, for the reception of the outer layers of the hose, denoted generally by 7; and the said member 3 is also formed with a central bore 8 to receive the inner layers of the hose, denoted generally by 9.

Part of the inner layers of the hose, including the rubber lining 10, are turned outwardly and fitted into an annular recess 11 formed in the front face of coupling member 3 and communicating with its bore 8, the said out-turned part being indicated generally by 12. The rubber face of the said out-turned part 12 is provided with a series of concentric beads or ridges 13 that are triangular in cross section and fitted to enter corresponding recesses 14 formed in the companion face of the coupling member 2. In the present instance four beads or ridges and four complementary recesses are shown, and it will be clear that the said elements will be brought into sealing contact when the coupling members 2 and 3 are fastened together by bolts passed through the annular series of holes represented by 4, 5.

While this sealing engagement has been shown, in practice, to be extremely tight and effective, it has also been learned that the great stresses of operation tend to injury of the part 12 and, particularly, of the beads or ridges 13 formed thereon. When such injury takes place there is a tendency to failure in operation because of leakage, and repair of this condition is somewhat time consuming and expensive because the coupling member 3 is usually firmly vulcanized into the hose so that the repair operation entails removal of the whole hose with its coupling member 3 and transportation to a suitable point at which the worn, damaged, or deformed part 12 may be reformed, repaired, or reconstructed.

Our invention is designed to, and does in fact, eliminate this cause of delay and expense by providing a separate sealing element 15 which may be located upon the face of the worn or injured part 12 and itself reestablish cooperative sealing engagement with the coupling member 2 when the coupling members are refastened together by the bolts, or the like, as hereinabove set forth.

As will be seen by reference to Figs. 2, 3 and 4, this sealing element 15 consists of an annular disk that is formed on its rear face with four concentric grooves, 16, 17, 18, 19, which grooves are of such size, shape, and location that they will accurately receive and fit upon the beads or ridges 13 formed on the face of the part 12 of the hose. The front face of the sealing element 15 is provided with four concentric beads, denoted generally by 20, that are in size, shape and arrangement exactly like the beads or ridges 13 and are, therefore, fitted for reception and tight sealing engagement in and with the recesses 14 formed in the coupling member 2. The sealing element 15 is also provided with a central opening 21 that corresponds in size to the interior of the hose lining 10 and to the opening 22 through coupling member 2 as well as to the interior of pipe 1.

We prefer that the sealing element 15 be composed of vulcanized rubber corresponding substantially with the lining 10 of the hose, although it may be composed of any other suitable wear-resisting and slightly yielding material. In practice, when there has been undue wear upon or injury to the operative face of the part 12 of the hose, the coupling members 2, 3 are unfastened and separated, the worn or injured face suitably cleaned, and the sealing element 15 fitted thereupon, preferably with the interposition of a layer of adhesive such as an appropriate self-curing rubber cement, either organic or aqueous. The coupling members may then be reassembled as indicated in Fig. 1 and bolted together, whereupon it will be found that the original substantially perfect sealing engagement has been reestablished and the hose and associated parts are in fit condition for extended and satisfactory continued operation.

With reference to the modified form shown in Figs. 5 to 8, inclusive, it may be said that all the parts and elements are the same as in the previously described form except that the sealing element, which is here marked 23, omits the innermost groove 16 on its rear face and is provided only with the three grooves 17, 18, and 19.

It has been found in practice that the tremendous working pressure within the hose and coupling tends to affect most deleteriously the innermost of the four concentric beads or ridges 13, and sometimes results in practically destroying the said innermost bead. In such cases, we have found it desirable to remove the remnants of the said innermost bead with a knife or suitable abrasive implement and to then apply the modified form of sealing element 23, as above described in connection with the application of sealing element 15. As the said modified form of element 23 omits entirely the innermost groove 16 on its rear face, the said portion of the sealing element will rest flatly and solidly upon that portion of the face of the hose part 12 from which the innermost bead or ridge has been removed, as just described; while the three grooves 17, 18 and 19 on the rear face of modified sealing element 23 will embrace the three remaining beads or ridges 13 on the hose part 12. This insures close mutual engagement of the said elements and eliminates an opportunity for pressure leakage which might exist if the first described form of sealing element 15 were used after the innermost bead or ridge 13 had been removed, because there would then exist the innermost groove 16 on the rear face of the sealing element without any bead or ridge to fill it when the sealing element was applied.

In respect to both forms of the invention, it may be stated that the sealing elements are extremely practical, not only because of their inexpensive character and simplicity of application, but also because, due to their form and composition, they compensate for irregularities and inequalities in the worn surface of hose part 12 and for other physical differences which may exist in the said surface, while not only maintaining, but usually augmenting, the firm resilience of the said element and providing for an equally good, if not better, sealing engagement with the coupling member 2. As those familiar with the art will understand, there is a tendency for vulcanized rubber, under the effects of use, to deteriorate not only as a result of abrasion but as a result of loss of resiliency, and it involves expense and frequently uncertainty in satisfaction if the situation requires repair of a rubber surface either by reformation or patching thereof. The reformation of course requires a certain equipment for its attainment and may result in an engaging surface of less thickness and resiliency than originally; while patching of the original surface may result in lack of sufficient bonding between the old and new parts as well as inequality of resilience.

Our invention serves to eliminate the disadvantages just recited and, by a simple and inexpensive procedure, reestablishes and even enhances the originally existing desired characteristics of the part in question. The sealing element herein set forth becomes, in effect, a unitary part of the surface to which it is applied because of its exact conformity thereto, and the intermediate adhesive easily serves the purpose of holding the sealing element in position because the mating beads or ridges and grooves accomplish that result to a great extent. An important function of the adhesive is to act as a sealing and anti-leak medium between the sealing element and the face to which it is attached, and this function is greatly augmented by the mating beads or ridges and grooves since they present a sinuous line of contact, when considered in a radial direction, between the sealing element and the surface to which it is attached, which strongly resists the tremendous pressure within the hose and coupling.

It will be understood that various changes may be resorted to in the form, construction, arrangement and material without departing from the spirit and scope of our invention, and hence we do not intend to be limited to the details herein shown and described except as they may be included in the claims.

What we claim is:

1. A coupling for securing high pressure flexible hose to well drilling apparatus comprising, cooperative members fitted to be drawn toward each other and secured in cooperative relationship, the face of one of said members being formed to receive a radially outwardly extending yieldable portion of the hose body, and a yieldable sealing element located between said portion of the hose body and the other coupling member, said sealing element having pre-formed projections on its front face and said last named coupling member having corresponding recesses in its face adjacent the sealing element, whereby, when said coupling members are drawn toward each other said portion of the hose body and said sealing element will be compressed therebetween and the projections on said sealing element will be compressed in mating relationship with the recesses in the adjacent coupling member.

2. A coupling for securing high pressure flexible hose to well drilling apparatus comprising, cooperative members fitted to be drawn toward each other and secured in cooperative relationship, the face of one of said members being formed to receive a radially outwardly extending yieldable portion of the hose body, and a replaceable yieldable sealing element located between said portion of the hose body and the other coupling member, said portion of the hose body having pre-formed projections on its front face, said sealing element having corresponding recesses on its rear face and pre-formed projections on its front face, and said last named coupling member having recesses in its face adjacent the sealing element corresponding to the last named projections on said element, whereby, when said coupling members are drawn toward each other said portion of the hose body and said sealing element will be compressed therebetween, the projections on said portion of the hose body will be compressed in mating relationship with the recesses in the rear face of the sealing element and the projections on the front face of the sealing element will be compressed in mating relationship with the recesses in the adjacent coupling member.

3. In a coupling for securing high pressure flexible hose to well drilling apparatus, a replaceable sealing element consisting of a yieldable disc having a flat portion and a pre-formed portion, the pre-formed portion having projections extending from a flat surface on one side thereof and recesses depressed in a flat surface on the other side thereof, whereby said sealing element is fitted to lie snugly against and reestablish a worn or injured surface which originally was a substantial counterpart of that side of the disc having the projections thereon.

EDWIN S. DAVIS.
JOHN H. REYNOLDS.